United States Patent
Zhang et al.

(10) Patent No.: US 6,417,268 B1
(45) Date of Patent: Jul. 9, 2002

(54) METHOD FOR MAKING HYDROPHOBICALLY ASSOCIATIVE POLYMERS, METHODS OF USE AND COMPOSITIONS

(75) Inventors: Huashi T. Zhang, South Pasadena, CA (US); Baraka A. Kawawa, Bensalem; Fu Chen, Newtown, both of PA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/455,024

(22) Filed: Dec. 6, 1999

(51) Int. Cl.$^7$ .............................................. C08L 31/00
(52) U.S. Cl. ........................ 524/833; 524/55; 524/831; 524/832
(58) Field of Search .............................. 524/827, 831, 524/832, 833, 55

(56) References Cited

U.S. PATENT DOCUMENTS

| | | |
|---|---|---|
| 3,091,542 A | 5/1963 | Anderson |
| 3,272,640 A | 9/1966 | Geurden |
| 3,435,027 A | 3/1969 | Desmarais et al. |
| 4,066,495 A | 1/1978 | Voigt et al. |
| 4,104,226 A | 8/1978 | Melzer et al. |
| 4,228,277 A | 10/1980 | Landoll |
| 4,243,802 A | 1/1981 | Landoll |
| 4,294,885 A | 10/1981 | Sunden |
| 4,305,860 A | 12/1981 | Iovine et al. |
| 4,388,150 A | 6/1983 | Sunden et al. |
| 4,395,524 A | 7/1983 | Emmons et al. |
| 4,432,881 A | 2/1984 | Evani |
| 4,443,589 A | 4/1984 | Tobias |
| 4,521,580 A | 6/1985 | Turner et al. |
| 4,524,175 A | 6/1985 | Stanley, Jr. |
| 4,528,348 A | 7/1985 | Turner et al. |
| 4,577,013 A | 3/1986 | Merz et al. |
| 4,684,704 A | 8/1987 | Craig |
| 4,694,046 A | 9/1987 | Bock et al. |
| 4,694,058 A | 9/1987 | Siano et al. |
| 4,696,962 A | 9/1987 | Danner et al. |
| 4,709,759 A | 12/1987 | Bock et al. |
| 4,730,028 A | 3/1988 | Bock et al. |
| 4,753,710 A | 6/1988 | Langley et al. |
| 4,792,593 A | 12/1988 | Schulz et al. |
| 4,798,653 A | 1/1989 | Rushmere |
| 4,814,096 A | 3/1989 | Evani |
| 4,831,092 A | 5/1989 | Bock et al. |
| 4,835,234 A | 5/1989 | Valint et al. |
| 4,845,175 A | 7/1989 | Lo |
| 4,847,342 A | 7/1989 | Peiffer |
| 4,853,447 A | 8/1989 | Peiffer |
| 4,861,499 A | 8/1989 | Neff et al. |
| 4,883,850 A | 11/1989 | Craig |
| 4,892,589 A | 1/1990 | Kirland et al. |
| 4,904,724 A | 2/1990 | Auchter et al. |
| 4,918,139 A | 4/1990 | Cuirassier et al. |
| 4,921,902 A | 5/1990 | Evani et al. |
| 4,963,632 A | 10/1990 | Bock et al. |
| 4,981,935 A | 1/1991 | Bock et al. |
| 4,994,112 A | 2/1991 | Majewicz et al. |
| 5,003,000 A | 3/1991 | Bock et al. |
| 5,021,526 A | 6/1991 | Ball |
| 5,089,578 A | 2/1992 | Valint et al. |
| 5,100,953 A | 3/1992 | Valint et al. |
| 5,116,923 A | 5/1992 | Bock et al. |
| 5,167,766 A | 12/1992 | Honig et al. |
| 5,171,803 A | 12/1992 | Walton et al. |
| 5,211,854 A | 5/1993 | Liao et al. |
| 5,274,055 A | 12/1993 | Honig et al. |
| 5,298,566 A | 3/1994 | Liao et al. |
| 5,302,196 A | 4/1994 | Meister et al. |
| 5,314,581 A | 5/1994 | Lin et al. |
| 5,324,765 A | 6/1994 | Mondet et al. |
| 5,340,865 A | 8/1994 | Neff et al. |
| 5,362,827 A | 11/1994 | Bock et al. |
| RE34,904 E | 4/1995 | Just et al. |
| 5,415,740 A | 5/1995 | Schuster et al. |
| 5,431,783 A | 7/1995 | Honig |
| 5,482,595 A | 1/1996 | Harrington, IV et al. |

(List continued on next page.)

FOREIGN PATENT DOCUMENTS

| | | |
|---|---|---|
| EP | 0 115 703 | 8/1984 |
| EP | 333499 | 9/1989 |
| EP | 630909 | 12/1994 |
| EP | 896966 | 2/1999 |
| WO | 99 03895 | 1/1999 |
| WO | 99 46319 | 9/1999 |
| WO | 99/55962 | 11/1999 |
| WO | 99/55965 | 11/1999 |

OTHER PUBLICATIONS

Encyclopedia of Polymer Science and Engineering, 2nd Edition, vol. 17, pp. 772 to 779.

*Primary Examiner*—Helen L. Pezzuto
(74) *Attorney, Agent, or Firm*—Martin F. Sloan

(57) ABSTRACT

Method for producing an hydrophobically associative polymer is provided which is characterized by forming a monomer solution comprising a surfactant, at least one hydrophobic ethylenically unsaturated monomer, at least one hydrophilic monomer selected from nonionic ethylenically monomers, cationic ethylenically unsaturated monomers, anionic ethylenically unsaturated monomers or mixtures thereof, and water; forming a salt solution comprising a multivalent salt and water; mixing the monomer solution and salt solution to form a mixed solution; and charging the mixed solution with an initiator, thereby polymerizing the monomers to form the hydrophobically associative polymer in a dispersion. Aqueous dispersion containing the hydrophobically associative polymer formed by the method. The aqueous dispersion containing the hydrophobically associative polymer may be used in a paint formulation, in a mobility control fluid useful in enhanced oil recovery, in a secondary or tertiary oil recovery system, in an enhanced oil recovery method, in a cementious composition, in an oil well drilling mud formulation, in a fracturing fluid formulation, in a wastewater treatment system, or in a dewatering sludge system.

14 Claims, No Drawings

U.S. PATENT DOCUMENTS

| | | |
|---|---|---|
| 5,597,858 A | 1/1997 | Ramesh et al. |
| 5,605,970 A | 2/1997 | Selvarajan |
| 5,614,602 A | 3/1997 | Connors et al. |
| 5,669,456 A | 9/1997 | Audibert et al. |
| 5,696,194 A | 12/1997 | Connors et al. |
| 5,707,533 A | 1/1998 | Connors et al. |
| 5,725,779 A | 3/1998 | Mallon et al. |
| 5,837,776 A | 11/1998 | Selvarajan et al. |
| 5,889,097 A | 3/1999 | Mallon et al. |
| 5,958,188 A | 9/1999 | Heard et al. |
| 5,969,011 A | 10/1999 | Frölich et al. |
| 5,985,992 A | 11/1999 | Chen |
| 6,093,217 A | 7/2000 | Frölich et al. |

METHOD FOR MAKING HYDROPHOBICALLY ASSOCIATIVE POLYMERS, METHODS OF USE AND COMPOSITIONS

CROSS-REFERENCE TO COPENDING APPLICATION

The present application expressly incorporates by reference herein the entire disclosure of U.S. application Ser. No. 09/455,027, entitled "Method for Using Hydrophobically Associative Polymers in Preparing Cellulosic Fiber Compositions, and Cellulosic Fiber Compositions Incorporating the Hydrophobically Associative Polymers", which is concurrently filed with the present application.

BACKGROUND OF THE INVENTION

1. Field of the Invention

The present invention relates to a method for making hydrophobically associative polymers (HAPs) using a brine dispersion method, and to compositions including these polymers.

2. Description of Background and Other Information

HAPs have been extensively studied in both academia and industry. The highly associative structure of a HAP in aqueous media results in its unique rheological properties, salt resistance and extremely high solution viscosity, which are very desirable in many applications, such as enhanced oil recovery, thickening and drug release applications.

U.S. Pat. Nos. 4,432,881 and 4,528,348 teach a micellar polymerization method for making polyacrylamide-based associative polymers by copolymerizing a hydrophobic comonomer with acrylamide or acrylic acid in aqueous solution in the presence of surfactants. The method has a severe disadvantage because the highly associative behavior of a HAP results in an extremely high bulk process viscosity, which causes difficulties in agitation and leads to incomplete monomer conversion. The high solution viscosity of HAP also leads to gel like final product appearance, and makes it very hard to transport and handle. Furthermore, the high process viscosity also limits the initial monomer concentration that could be used for the polymerization, which results in a final polymer having lower Molecular Weight (MW) and lower active content compared to the polymers made by emulsion and dispersion polymerization methods. Therefore, micellar polymerization is not a desirable method for large-scale production of HAP polymers.

U.S. Pat. Nos. 4,524,175 and 4,521,580 also teach, respectively, a HAP production method by water-in-oil emulsion and a HAP production method by microemulsion. However, the methods result in a product containing a significant amount of oil and surfactant which is undesirable for some applications and may cause increasing environmental concern as well as the inconvenience and expense associated with the make-down equipment for feeding the emulsions.

U.S. Pat. No. 5,707,533 teaches a brine dispersion polymerization method for preparing high molecular weight polyacrylamide copolymers comprising polymerizing a cationic monomer and an N-alkylacrylamide or an N,N-dialkylacrylamide in an aqueous salt solution. However, the associative properties of the polymers and the surfactant addition as described in the present invention is not disclosed in the '533 patent.

SUMMARY OF THE INVENTION

The present invention is directed to a method for producing HAPs by a brine dispersion polymerization method. Highly associative anionic HAP with its MW larger than 1,000,000 Dalton is synthesized in an aqueous salt solution. The HAP final product with a homogenous particle dispersion form has a bulk viscosity below 3000 cp.

The present invention relates to a method for producing a HAP which includes forming a monomer solution containing surfactant, at least one hydrophobic ethylenically unsaturated monomer, at least one hydrophilic monomer selected from nonionic ethylenically monomers, cationic ethylenically unsaturated monomers, anionic ethylenically unsaturated monomers or mixtures thereof, and water; forming a salt solution containing multivalent salt, stabilizer and water; mixing the monomer solution and the salt solution to form a mixed solution; and charging the mixed solution with an initiator, thereby polymerizing the monomers to form the HAP. The method may further include adding from about 0.01 to about 0.5 grams of free radical initiator per 100 grams of the total monomer.

The monomer solution may be formed by mixing the at least one hydrophilic monomer and water to form a monomer solution, adding the at least one hydrophobic ethylenically unsaturated monomer and surfactant to the monomer solution, and mixing until homogeneous.

The salt may be present in an amount of up to about 50% by weight, or preferably from about 10% to about 30% by weight, of the salt solution. The stabilizer may be present in an amount of up to 10% by weight of the salt solution, preferably in an amount from about 0.05% to about 2% by weight and more preferably in an amount from about 0.1% to about 0.5% by weight. A preferred stabilizer may be chemically modified quar gum.

The surfactant may be present in an amount up to about 10% by weight of the monomer solution, preferably in an amount from about 0.1% to about 2% by weight, and more preferably in an amount from about 0.25% to about 1% by weight. A preferred surfactant is sodium dodecyl sulfate.

The HAP is preferably a copolymer of acrylic acid, acrylamide, and lauryl acrylate.

The present invention also relates to a method for producing a HAP which includes: mixing at least one hydrophilic monomer selected from nonionic ethylenically monomers, cationic ethylenically unsaturated monomers, anionic ethylenically unsaturated monomers or mixtures thereof and water to form a monomer solution; adding at least one hydrophobic ethylenically unsaturated monomer and surfactant to the monomer solution and mixing until homogeneous; forming a salt solution comprising multivalent salt, stabilizer and water; mixing the monomer solution and the salt solution to form a mixed solution; and charging the mixed solution with an initiator to polymerize the monomers to form the HAP.

The present invention also relates to a method for producing a water soluble HAP containing acrylic acid, acrylamide, and lauryl acrylate, wherein the method includes forming a monomer solution of acrylic acid, acrylamide, lauryl acrylate, an anionic surfactant, and water; forming a salt solution comprising multivalent salt, stabilizer and water; mixing the monomer solution with the salt solution to form a mixed solution; and adding an initiator to the mixed solution, thereby polymerizing the acrylic acid, the acrylamide and the lauryl acrylate to produce a dispersion containing the water soluble HAP.

The present invention also relates to a method for producing a hydrophobically associative polymer which includes:

forming a monomer solution comprising up to about 10% by weight of surfactant, at least one hydrophobic ethylenically unsaturated monomer, at least one hydrophilic monomer selected from nonionic ethylenically monomers, cationic ethylenically unsaturated monomers, anionic ethylenically unsaturated monomers or mixtures thereof, and water;

forming a salt solution comprising up to about 50% by weight of multivalent salt, up to 10% by weight of stabilizer and water, the weight percent being based on the total weight of the salt solution;

mixing the monomer solution and the salt solution to form a mixed solution; and charging the mixed solution with from about 0.01 to about 0.5 grams of free radical initiator per 100 grams of the total monomer content, thereby polymerizing the monomers to form the HAP.

The present invention also relates to an aqueous dispersion comprising the HAP made by any of the foregoing methods. The aqueous dispersions have many uses. The aqueous dispersion containing the HAP may be used as the one or more retention and drainage aids in a papermaking process from pulp furnish or as the one or more thickeners in a paint formulation containing pigment, polymer and a thickener.

The aqueous dispersion containing the HAP may be used as the one or more thickening agents in a mobility control fluid useful in enhanced oil recovery operations or as the one or more fluid loss control additives in a hydraulic cementious composition.

The aqueous dispersion containing the HAP may be used as the one or more viscosification agents either in an oil well drilling mud formulation for oil field production or in an oil well completion fluid.

The aqueous dispersion containing the HAP may also be used in a fracturing fluid formulation in oil recovery.

The aqueous dispersion containing the HAP may be used as the one or more flocculation aids in a waste water treatment system or in a dewatering sludge system.

The aqueous dispersion containing the HAP may be used as the one or more rheology controls in a secondary or tertiary oil recovery system.

The aqueous dispersion containing the HAP may be used as the one or more mobility control agents in an enhanced oil recovery method which includes forcing an aqueous flooding medium containing one or more mobility control agents from an injection well through a subterranium formation toward a producing well.

Other exemplary embodiments and advantages of the present invention may be ascertained by reviewing the present disclosure.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The inventive method can successfully polymerize a hydrophobic comonomer with one or more hydrophilic comonomers to produce a high molecular weight HAP. An important advantage of the present method over the existing micellar polymerization process is its ability to avoid high viscosity during polymerization and to provide complete monomer polymerization with an attendant high active content in the HAP. These advantages make this an ideal method for production scaleup. Moreover, the resultant HAP is in an aqueous homogeneous dispersion, which does not contain any oil, and is highly desirable in a papermaking process, and may be used without further processing, because the salt in the dispersion will not affect the papermaking process. In papermaking, the dispersion may be diluted with water on site and caustic may be added to neutralize the dispersion, if desired.

The make-down process of this dispersion, i.e., the dilution of the dispersion, is easier as compared to the prior art emulsion products, which contain oil. The resulting HAP is highly associative in aqueous solution as indicated by its viscosity and viscoelasticity, which sets it apart from conventional high molecular weight dispersion products.

If the end user desires to remove the salt from the dispersion, the salt may be removed by using a conventional dialysis method.

The aqueous dispersion containing the HAP is a concentrate, which can be diluted by the end user to meet the end user's particular needs. For example, the aqueous dispersion containing the HAP may used as thickening agents for paint formulations or for personal care applications.

The aqueous dispersion containing the HAP can be used as retention and drainage aids for papermaking process as illustrated in the examples. Furthermore, the aqueous dispersion containing the HAP may be used as clarifying agents and flocculation aids for water and wastewater treatment and for sludge dewatering. The aqueous dispersion containing the HAP can also be used as a binder for non-woven materials or in waterborne adhesives. The aqueous dispersion containing the HAP may be used in water-based inks.

The aqueous dispersion containing the HAP may be used as a fluid loss control additive in hydraulic cement compositions, i.e., inorganic cements that harden or set under the influence of water. These compositions are frequently used in cementing operations associated with oil, gas, water and brine wells, as well as dam and tunnel construction. For example, aqueous hydraulic cement slurries are used during or after the completion of the drilling of an oil or gas well to fill the annulus between the borehole and the outside of the casing. In some cases, the borehole is in porous strata and the water in the hydraulic cement composition may flow out of the slurry into the porous strata. As a consequence, the cement composition may not properly cure. To prevent the fluid loss, a fluid loss control additive is added to the cementious composition.

In oil field production, the aqueous dispersion containing the HAP may be used in a drilling mud formulation, in an oil well completion fluid, in an oil field work fluid, in a fracturing fluid formulation in oil recovery, or as a thickening agent in a mobility control fluid useful in enhanced oil recovery operations. The dispersion may be used as a rheology control for secondary or tertiary oil recovery.

The present method for making the HAP includes the following steps:

1) forming a monomer solution of one or more of nonionic monomer, anionic monomer and cationic monomer in distilled water, 2) forming a solution of hydrophobic monomer with a surfactant, 3) mixing the two solutions until a homogeneous monomer solution is formed,
4) preparing a brine solution comprising distilled water, multi-valent salt and stabilizer,
5) mixing the solution of step 3 with the brine solution of step 4 and charging the mixed solution to a reaction kettle, and
6) polymerizing the solution to produce the HAP in a dispersion.

The order of mixing is not critical to the inventive method as long as the resultant mixture is a solution or a homogeneous dispersion. For example, the monomer solutions of both hydrophilic monomers and hydrophobic monomers can be formed in one step or in multiple steps without regard to the order of the steps. Likewise, depending upon the conditions, the skilled worker may mix the brine solution with the various monomers at the same time. The monomers, surfactants, polymerization initiators and initiator burnout to be utilized are conventional materials known in the art to the skilled artisan. The method and materials to be utilized are explained in more detail below.

The HAP is preferably a copolymer comprising hydrophobic groups that are capable of forming physical network structure through hydrophobic association, and at least one monomer selected from the group consisting of nonionic ethylenically unsaturated monomers, cationic ethylenically unsaturated monomers, and anionic ethylenically unsaturated monomers. Further, as a matter of preference, the indicated monomers of the water-soluble hydrophobically modified polymer comprise at least one hydrophobic ethylenically unsaturated monomer, at least one anionic ethylenically unsaturated monomer, and at least one nonionic ethylenically unsaturated monomer. As a matter of particular preference, the at least one hydrophobic ethylenically unsaturated monomer comprises a monomer selected from the group consisting of $C_8$–$C_{20}$ alkyl esters or amides of ethylenically unsaturated monomer, while the at least one anionic comprises at least one member selected from the group consisting of acrylic acid, methacrylic acid, and their salts, and the at least one nonionic ethylenically unsaturated monomer comprises at least one member selected from the group consisting of acrylamide and methacrylamide. The preferred polymer will have a dynamic oscillation frequency sweep tan δ value below 1.

Suitable HAPs include copolymers comprising at least one hydrophobic ethylenically unsaturated monomer. These copolymers further include at least one nonionic ethylenically unsaturated monomer, and/or at least one cationic ethylenically unsaturated monomer, and/or at least one anionic ethylenically unsaturated monomer. The HAP may include copolymers of methacrylic or acrylic acid, acrylamide or methyl acrylamide and lauryl acrylate or lauryl methyl acrylate.

As a matter of preference, the proportion of hydrophobic ethylenically unsaturated monomer in the HAP is within a range which renders the polymer water soluble hydrophobically associative—i.e., the hydrophobic monomer concentration is low enough so that the polymer is still water soluble, but sufficient to provide the associative property as discussed herein. In this regard, the HAP of the invention preferably comprises about 0.001 mole percent to about 10 mole percent—more preferably about 0.01 mole percent to about 1 mole percent, and still more preferably about 0.1 mole percent to about 0.5 mole percent—hydrophobic ethylenically unsaturated monomer.

The HAPs of the invention include anionic, nonionic, and cationic and amphoteric copolymers. Of these, the anionic copolymers are preferred.

The anionic copolymers comprise at least one hydrophobic ethylenically unsaturated monomer and at least one anionic ethylenically unsaturated monomer. Preferably, the anionic copolymers further comprise at least one nonionic ethylenically unsaturated monomer. Particularly preferred are the terpolymers consisting of, or consisting essentially of or substantially of, at least one hydrophobic ethylenically unsaturated monomer, at least one anionic ethylenically unsaturated monomer, and at least one nonionic ethylenically unsaturated monomer.

For the anionic copolymers, the preferred hydrophobic ethylenically unsaturated monomers are the hydrocarbon esters of α,β-ethylenically unsaturated carboxylic acids and their salts, with dodecyl acrylate and dodecyl methacrylate being particularly preferred. Preferred nonionic ethylenically unsaturated monomers are acrylamide and methacrylamide. Preferred anionic ethylenically unsaturated monomers are acrylic acid and methacrylic acid.

The anionic copolymers preferably comprise about 0.001 mole percent to about 10 mole percent hydrophobic ethylenically unsaturated monomer, about 1 mole percent to about 99.999 mole percent nonionic ethylenically unsaturated monomer, and about 1 mole percent to about 99.999 mole percent anionic ethylenically unsaturated monomer. More preferably, they comprise about 0.01 mole percent to about 1 mole percent hydrophobic ethylenically unsaturated monomer, about 10 mole percent to about 90 mole percent nonionic ethylenically unsaturated monomer, and about 10 mole percent to about 90 mole percent anionic ethylenically unsaturated monomer. Still more preferably, they comprise about 0.1 mole percent to about 0.5 mole percent hydrophobic ethylenically unsaturated monomer, about 50 mole percent to about 70 mole percent nonionic ethylenically unsaturated monomer, and about 30 mole percent to about 50 mole percent anionic ethylenically unsaturated monomer.

Preferred anionic HAPs include:
1) polymers comprising about 50 mole percent of acrylic acid, about 0.1 to about 0.5 mole percent of lauryl methacrylate and about 49.9 to about 49.5 mole percent of acrylamide;
2) copolymers comprising about 50 mole percent of acrylic acid, about 0.1 to about 0.5 mole percent of lauryl acrylate and about 49.9 to about 49.5 mole percent of acrylamide;
3) copolymers comprising about 50 mole percent of methacrylic acid, about 0.1 to about 0.5 mole percent of lauryl methacrylate and about 49.9 to about 49.5 mole percent of acrylamide; and
4) copolymers comprising about 50 mole percent of methacrylic acid, about 0.1 to about 0.5 mole percent of lauryl acrylate and about 49.9 to about 49.5 mole percent of acrylamide.

The HAP of the invention preferably has a weight average molecular weight of about 10,000 to about 10,000,000. This polymer more preferably has a weight average molecular weight of about 100,000 to about 5,000,000, and still more preferably about 500,000 to about 3,000,000.

Size Exclusion Chromatography (SEC) is used to determine weight average molecular weight. A dilute solution of polymer, typically 2% or less, is injected into a packed column. The polymer is separated based on the size of the dissolved polymer molecules and compared with a series of standards to derive the molecular weight.

1. Definitions

As used herein, the term "HAP" refers to the hydrophobically associative polymer of this invention.

As used herein, the term "hydrocarbon" includes "aliphatic", "cycloaliphatic", and "aromatic". The terms "aliphatic" and "cycloaliphatic"—unless stated otherwise—are understood as including "alkyl", "alkenyl", "alkynyl", and "cycloalkyl". The term "aromatic"—also unless stated otherwise—is understood as including "aryl", "aralkyl", and "alkaryl".

Hydrocarbon groups are understood as including both nonsubstituted hydrocarbon groups and substituted hydrocarbon groups, with the latter referring to the hydrocarbon portion bearing additional substituents besides the carbon and hydrogen. Correspondingly, aliphatic, cycloaliphatic, and aromatic groups are understood as including both non-substituted aliphatic, cycloaliphatic, and aromatic groups and substituted aliphatic, cycloaliphatic, and aromatic groups, with the latter referring to the aliphatic, cycloaliphatic, and aromatic portion bearing additional substituents besides the carbon and hydrogen.

Also as discussed herein, copolymers are understood as including polymers consisting of, or consisting substantially of or consisting essentially of, two different monomeric units. Copolymers are further understood as including polymers incorporating three or more different monomeric units, e.g., terpolymers, etc.

2. Hydrophobic Monomer

The hydrophobic monomers which are useful in this method are those known in the art. They include water-insoluble hydrophobic ethylenically unsaturated monomers, particularly water-insoluble monomers, having hydrophobic groups. The hydrophobic groups include hydrophobic organic groups, such as those having hydrophobicity comparable to one of the following: aliphatic hydrocarbon groups having at least six carbons (preferably from $C_8$ to $C_{22}$ alkyls and preferably from $C_6$ to $C_{22}$ cycloalkyls); polynuclear aromatic hydrocarbon groups such as benzyls, substituted benzyls and naphthyls; alkaryls wherein alkyl has one or more carbons; haloalkyls of four or more carbons, preferably perfluoroalkyls; polyalkyleneoxy groups wherein the alkylene is propylene or higher alkylene and there is at least one alkyleneoxy unit per hydrophobic moiety. The preferred hydrophobic groups include those having at least 6 carbons or more per hydrocarbon group, preferably $C_6$ to $C_{22}$ alkyl groups or those having at least 6 carbons or more per perfluorocarbon group, such as the $C_6F_{13}$–$C_{22}F_{45}$. Particularly preferred are the $C_8$–$C_{20}$ alkyl groups.

Suitable hydrocarbon group-containing ethylenically unsaturated monomers include the esters or amides of the $C_6$ and higher alkyl groups.

Particular suitable esters include dodecyl acrylate, dodecyl methacrylate, tridecyl acrylate, tridecyl methacrylate, tetradecyl acrylate, tetradecyl methacrylate, octadecyl acrylate, octadecyl methacrylate, nonyl-α-phenyl acrylate, nonyl-α-phenyl methacrylate, dodecyl-α-phenyl acrylate, and dodecyl-α-phenyl methacrylate.

The $C_{10}$–$C_{20}$ alkyl esters of acrylic and methacrylic acid are preferred. Of these, dodecyl acrylate and methacrylate are particularly preferred.

Also the following hydrocarbon group-containing ethylenically unsaturated monomers may be used:

N-alkyl, ethylenically unsaturated amides, such as N-octadecyl acrylamide, N-octadecyl methacrylamide, N,N-dioctyl acrylamide and similar derivatives thereof, α-olefins, such as 1-octene, 1-decene, 1-dodecene, and 1-hexadecene;

vinyl alkylates wherein the alkyl has at least eight carbons, such as vinyl laurate and vinyl stearate;

vinyl alkyl ethers, such as dodecyl vinyl ether and hexadecyl vinyl ether;

N-vinyl amides, such as N-vinyl lauramide and N-vinyl stearamide; and alkylstyrenes such as t-butyl styrene.

The hydrophobic monomer is present in an amount up to about 10 mole percent. It is preferred that the hydrophobic monomer be present in an amount from about 0.1 to about 2 mole percent and most preferred that the hydrophobic monomer be present in an amount from about 0.25 to about 1 mole percent. A preferred hydrophobic monomer is lauryl acrylate.

3. Nonionic Hydrophilic Monomers

The nonionic hydrophilic monomers useful in this method are those known in the art. They include nonionic ethylenically unsaturated monomers such as acrylamide; methacrylamide; N-alkylacrylamides, such as N-methylacrylamide; N,N-dialkylacrylamides, such as N,N-dimethylacrylamide; methyl acrylate; methyl methacrylate; acrylonitrile; N-vinyl methylacetamide; N-vinyl methyl formamide; vinyl acetate; N-vinyl pyrrolidone; mixtures of any of the foregoing and the like. Of the foregoing, acrylamide, methacrylamide, and the N-alkylacrylamides are preferred, with acrylamide being particularly preferred.

The nonionic hydrophilic monomer is present in an amount up to about 99 mole percent. It is preferred that the nonionic hydrophilic monomer be present in an amount from about 10 to about 90 mole percent and most preferred that the nonionic hydrophilic monomer be present in an amount from about 30 to about 70 mole percent.

4. Cationic Hydrophilic Monomers

The cationic hydrophilic monomers useful in this method are those known in the art. They include cationic ethylenically unsaturated monomers such as diallyldialkylammonium halides, such as diallyldimethylammonium chloride; acryloxyalkyltrimethylammonium chloride; the (meth) acrylates of dialkylaminoalkyl compounds, and the salts and quaternaries thereof; the N,N-dialkylaminoalkyl(meth) acrylamides, and the salt and quaternaries thereof, such as N,N-dimethylaminoethylacrylamides; (meth) acrylamidopropyltrimethylammonium chloride; and the acid and quaternary salts of N,N-dimethylaminoethylacrylate; N-vinylformamide and the associated hydrolyzate N-vinylamine homopolymers and copolymers; the quaternized N-vinylamine homopolymers and copolymers. The N,N-dialkylaminoalkyl acrylates and methacrylates, and their acid and quaternary salts, are preferred, with the methyl chloride quaternary of N,N-dimethylaminoethylacrylate being particularly preferred.

Further as to the cationic monomers, suitable examples include those of the following general formulae:

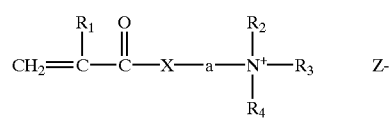

where $R_1$ is hydrogen or methyl, $R_2$ is hydrogen or lower alkyl of $C_1$ to $C_4$, $R_3$ and/or $R_4$ are hydrogen, alkyl of $C_1$ to $C_{12}$, aryl, or hydroxyethyl, and $R_2$ and $R_3$ or $R_2$ and $R_4$ can be combined to form a cyclic ring containing one of more hetero atoms, Z is the conjugate base of an acid, X is oxygen or ——$NR_1$ wherein $R_1$ is as defined above, and a is an alkylene group of $C_1$ to $C_{12}$; or

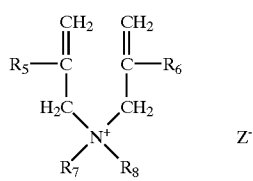

where $R_5$ and $R_6$ are hydrogen or methyl, $R_7$ is hydrogen or alkyl of $C_1$ to $C_{12}$, and $R_8$ is hydrogen, alkyl of $C_1$ to $C_{12}$, benzyl, or hydroxyethyl; and Z is as defined above; or

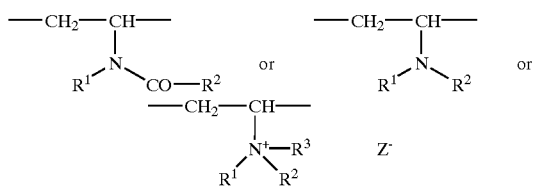

where $R^1$, $R^2$ and $R^3$ are each H or $C_1$ to $C_3$ alkyl, and Z is defined above.

The cationic hydrophilic monomer is present in an amount up to about 99 mole percent. It is preferred that the cationic hydrophilic monomer be present in an amount from about 10 to about 90 mole percent and most preferred that the cationic hydrophilic monomer be present in an amount from about 30 to about 70 mole percent.

4. Anionic Hydrophilic Monomers

The anionic hydrophilic monomers useful in this method are those known in the art. They include anionic ethylenically unsaturated monomers such as acrylic acid, methacrylic acid, and their salts; 2-acrylamido-2-methyl-propane sulfonate; sulfoethyl-(meth)acrylate; vinylsulfonic acid; styrene sulfonic acid; and maleic and other dibasic acids and their salts. Acrylic acid, methacrylic acid and their salts are preferred, with the sodium and ammonium salts of acrylic acid being particularly preferred.

The anionic hydrophilic monomer is present in an amount up to about 99 mole percent. It is preferred that the anionic hydrophilic monomer be present in an amount from about 10 to about 90 mole percent and most preferred that the anionic hydrophilic monomer be present in an amount from about 30 to about 70 mole percent.

5. Surfactants

The method relies on the complete solubilization of the water insoluble monomer by means of a dilute solution of a suitable water soluble surfactant. The type and concentration of surfactant are chosen to produce a clear, uniform, homogeneous aqueous dispersion of the hydrophobic monomers in the presence of both non-ionic and anionic water soluble monomers and, in addition, the reaction medium remains a clear, uniform, homogeneous mixture with no phase separation as the reaction proceeds to completion. The micelles formed by the surfactant are small aggregates, consisting of on the order of 50 to 200 molecules. They are stable toward phase separation and effectively disperse the water insoluble monomer on a very fine scale so that the polymerization is effected without the formation of latexes of fine particulates of water insoluble polymer.

The surfactants which may be used in this method may be any surfactant known in the art, such as those disclosed in McCutcheon's Emulsion Detergents. The surfactants may be one of the water soluble surfactants, such as salts of alkyl sulfates, sulfonates and carboxylates, or alkyl arene sulfates, sulfonates or carboxylates or may be nitro product based surfactants. Preferred surfactants are sodium or potassium salts of decyl sulfate, dodecyl sulfate or tetradecylsulfate. For these ionic surfactants the Kraft point, which is defined as the minimum temperature for micellar formation, must be below the temperature used for the polymerization. Thus, at the conditions of polymerization the desired surfactant will form micelles which solubilize the water insoluble monomer. Nonionic surfactants can also be used for preparing the polymers of this invention. For example, ethoxylated alcohols, ethoxylated alkyl phenols, ethoxylated dialkyl phenols, ethylene oxide-propylene oxide copolymers and polyoxyethylene alkyl ethers and esters can be used. Preferred nonionic surfactants are ethoxylated nonyl phenol with 5 to 20 ethylene oxide units per molecule, ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule. Surfactants which contain both nonionic and anionic functionality, e.g., sulfates of ethoxylated alcohols and alkyl phenols, can also be used.

Combinations of anionic and nonionic surfactants can also be used, as long as the surfactants solubilize the hydrophobic monomer into an aqueous phase containing the water soluble monomers. Thus, the actual concentration of surfactant for a given polymerization will depend on the concentration of oil soluble or hydrophobic monomers employed.

The surfactant should be present in an amount up to about 10 weight percent. It is preferred that the surfactant be present in an amount from about 0.1 to about 5 weight percent and most preferred that the surfactant be present in an amount from about 0.2 to about 2 weight percent. A preferred surfactant is sodium lauryl sulfate.

6. Initiators

Polymerization of the water soluble and water insoluble monomers is effected in an aqueous micellar solution containing a suitable free radical initiator. Examples of suitable water soluble free radical initiators include peroxides, such as hydrogen peroxide, and persulfates, such as sodium, potassium or ammonium persulfate. The concentration of the free radical initiator is about 0.01 to about 0.5 gram per hundred grams of total monomers. Suitable oil soluble initiators are organic peroxides and azo compounds, such as azobisisobutyronitrile. Water soluble redox initiators are preferred, such as potassium persulfate and sodium metabisulfite. Redox initiation involving an oxidant, such as potassium persulfate, and a reductant, such as sodium metabisulfite, can also be used to initiate polymerization, particularly at low temperatures.

Polymerizing at lower temperatures results in the formation of higher molecular weight polymers which are desirable from the standpoint of efficient aqueous viscosification. The polymerization temperature is preferably about 0° C. to about 90° C., more preferably about 15° C. to about 70° C.

The initiators may be present in an amount from about 1 to about 100,000 parts per million (ppm). It is preferred that the initiators be present in an amount from about 10 to about 1,000 ppm and it is most preferred that initiators be present in an amount from about 30 to about 300 ppm.

7. Brine Solution

The polyvalent salt is preferably a sulfate or phosphonate such as ammonium, sodium, magnesium or aluminum sulfate or ammonium, sodium or potassium hydrogen phosphate. The concentration of salt in the aqueous salt solution may be up to about 50 weight percent of the total solution.

It is preferred that the polyvalent salt be present in an amount from about 10 to about 30 weight percent and most preferred that the polyvalent salt be present in an amount from about 10 to about 18 weight percent of the total solution.

The monomer solution exerts a hydrophobic effect in aqueous environment. Without being bound by theory, it is believed that the salt plays two roles—initially the salt solubilizes the monomers into aqueous solution and after polymerization of the monomers into a HAP, the salt precipitates the HAP. The amount of salt needed is directly related to the concentration of the monomer solution. The more concentrated the monomer solution, the more salt is needed.

7. Stabilizer

Stabilizer is crucial to the system since it affects the homogeneity of the dispersion and the appearance thereof. Because of the stabilizer, the dispersion is easier to process and has less tendency to clogging or settling out. The resulting dispersion is stable and without phase separation in storage.

The stabilizers may include any vegetable gum, a polysaccharide, or a cellulose product, as well as their chemically modified derivatives. They can be modified by reacting gum, polysaccharide or cellulose with long chain alkyl group, propylene oxide, ethylene oxide, chloroacetic acid, or N-(3-chloro-2-hydroxypropyl)trimethylammonium chloride (Quat 188 from Dow), respectively to obtain hydrophobic, anionic or cationic derivatives. A preferred stabilizer of the invention is a modified guar gum, Galactasol Gum 60F3HDS, from Aqualon Division of Hercules, Inc.

The stabilizer may be present in an amount up to about 10 weight percent of the salt solution. It is preferred that the stabilizer be present in an amount from about 0.5 to about 2 weight percent and most preferred that the stabilizer be present in an amount from about 0.1 to 0.5 weight percent.

EXPERIMENTS

Comparative Example 1

Micellar Solution Polymerization of HAP

TABLE I

| Micellar Solution Polymerization Samples | | |
| --- | --- | --- |
| Polymer | Monomers | Feed Ratio (mole %) |
| I | AA/AM | 45/55 |
| II | AA/AM/LA | 45/54/1 |

In the case of Polymer II, a solution of 2.75 parts of acrylamide, 0.17 parts (1 mol % of the monomers) of lauryl acrylate, 2.25 parts of acrylic acid, 1 part of the nonionic surfactant (Tergitol 15-S-9, Union Carbide), and 100 parts of deionized water is deoxygenated under stirring at room temperature by sparging with nitrogen for 45 minutes. 0.5 part of a 2 mg $KBrO_3$ solution is added and 10 parts of 0.03% of $NaS_2O_5$ is injected by a syringe pump over 60 minutes. The copolymer is obtained by the precipitation of the polymerization solution in acetone and dried under vacuum at 50° C. overnight.

Polymer I is prepared using the same method and proportions as with Polymers II except without the lauryl acrylate.

For both Polymers I and II, the resulting dried product is redissolved in deionized water to produce a 0.5% polymer solution which is subjected to viscosity characterization.

Example 2

Brine Dispersion Polymerization of HAP

TABLE 2

| Brine dispersion polymerization samples | | |
| --- | --- | --- |
| Polymer | Monomers | Feed Ratio (mole %) |
| III | AA/AM | 50/50 |
| IV | AA/AM/LA | 50/49.25/0.75 |

In the case of HAP polymer IV, a stabilizer brine solution is prepared by adding 240 grams of deionized (DI) water using an overhead mixer and gradually adding 1.2 grams of Galactasol gum while mixing at 400 rpm. The mixing is continued for 15 minutes until a homogeneous solution is formed. Thereafter, 60 grams of ammonium sulfate is added while mixing until all salt is dissolved.

A monomer solution is prepared by charging 55.4 grams of acrylamide (53% aqueous solution), 30.1 grams of acrylic acid (99%) and 4.5 grams of sodium lauryl sulfate (98%) into a beaker with a magnetic stir bar. The contents are stirred until a homogeneous solution is formed. 0.5 gram of lauryl acrylate (90%) and 0.25 gram of ethylenediaminetetraacetic acid (EDTA) (70% aqueous solution) are further charged to the monomer solution. The stirring is continued until the solution becomes homogeneous. Then, the monomer solution, the previous prepared stabilizer brine solution and 169 grams deionized water are homogenized together by a household blender and mixed for about 3 minutes. The mixed solution is then transferred to a reaction kettle equipped with a 4-neck head, a Claisen adapter, a bubble line on top of a condenser, a nitrogen sparge tube, a septum, a thermocouple and an overhead stirrer with a 2 blades steel stir shaft. The reaction kettle is placed in a cold water bath to maintain the monomer solution temperature at 18° C., and is sparged by nitrogen for 45 minutes.

A 0.1% sodium metabisulfite solution and a 1% potassium bromate solution are prepared. The sodium metabisulfite solution is sparged with nitrogen gas for 5 minutes. 17.5 mls of the 0.1% sodium metabisulfite solution is transferred to a 20 ml. syringe.

The polymerization is initiated by charging 1.5 mls of 1% potassium bromate solution to the reaction kettle and the mixing rate is set to 300 rpm. Thereafter, 17.5 mls of the 0.1% sodium metabisulfite solution is added via a syringe pump at a rate of 0.2 ml/min. When the polymerization temperature reaches 20° C., the water bath is removed from the reaction kettle, and the polymerization temperature is allowed to rise up to its maximum (about 35° C.). The polymerization is continued for one hour after the addition of sodium metabisulfite is over. After about one hour, the polymerization solution is cooled and the dispersion product is filtered through a Caisson screener. The resulting HAP product is a homogenous white dispersion with its bulk viscosity being about 450 cP.

Polymer III is produced under the same conditions as that of polymer IV without Lauryl Acrylate comonomer for comparison purposes.

Example 3

TABLE 3

HAP Characterization

| Polymer | Active Content (wt %)[1] | Bulk Viscosity (cP)[2] | 0.5% Solution Viscosity (cP)[2] | Frequency Sweep Tan δ at 0.0068 Hz[3] |
|---|---|---|---|---|
| I | 5 | Gel | 600 | 19.9 |
| II | 5 | Gel | 12,000 | 0.89 |
| III | 10 | 745 | 2,700 | 7.23 |
| IV | 10 | 450 | 4,330 | 0.72 |

Monomer Concentration
Brookfield Viscosity at 12 rpm
Viscoelasticity

Polymers (I–IV) are characterized by Brookfield viscosity and viscoelasticity.

Polymer II, a HAP made by micellar solution polymerization, has a gel appearance even at a 5% active content. On the other hand, polymer IV, a HAP made in accordance with the present invention, has a much lower bulk viscosity at a 10% active content than polymer II. The foregoing comparison shows that polymer IV, a HAP made in accordance with this invention, exhibits better and unexpected properties over the HAP made by micellar solution polymerization. In addition, polymer IV has a lower manufacturing cost and easier handling than polymer II.

Polymer I, a non HAP made by micellar solution polymerization, also has a gel appearance at a 5% active content, whereas polymer III, a non HAP made by brine dispersion, has a lower bulk viscosity at a 10% active content. Furthermore, the higher 0.5% solution viscosity of the non HAP (polymer III) indicates that HAP (polymer IV) made by brine dispersion method has higher MW than that of the HAP made by micellar solution method. This, again, shows a significant advantage of brine dispersion method in many desirable applications.

The association property of the HAPs is investigated by viscoelasticity. A frequency sweep in dynamic oscillation mode is conducted in a Haake RS-75 controlled stress rheometer at a constant stress of 0.1 Pa, and a frequency range of 0.000147 Hz to 10 Hz with 3 readings per frequency decade. The tan δ is the ratio of the loss (viscous) modulus to storage (elastic) modulus, determined according to:

$$\tan \delta = \text{storage modulus/loss modulus} = G''/G'$$

Materials that possess a higher tan δ value exhibit more viscous properties, while a lower tan δ will indicate more elastic properties. At a low frequency such as 0.0068 Hz, the rate of stress on the sample will permit a linear polymer to disentangle, and exhibit a viscous type response, or a higher tan δ. On the other hand, polymers with either chemical or physical network structure exhibit significant entanglement of the polymer chains and exhibit lower values of tan δ, and thus are more elastic. As shown in Table 3, higher values (19.9 and 7.23) tan δ at 0.0068 Hz are observed for the unmodified control polymers, while the HAPs made by both methods provide the tan δ value smaller than 1 (0.89 and 0.72). This clearly demonstrates the strong associative behavior of the HAPs, and it is consistent with the viscosity data.

Example 4

Lauryl Methacrylate as the Hydrophobic Comonomer

TABLE 4

HAP Brine dispersion polymerization samples

| Polymer | Monomers | Feed Ratio (Mol %) | Bulk Viscosity (cP)[1] | 0.5% solution Viscosity (cP)[1] | Tan δ at 0.0068 Hz[2] |
|---|---|---|---|---|---|
| IV | AA/AM/LA | 50/49.75/0.25 | 450 | 4,330 | 0.72 |
| V | AA/AM/LMA | 50/49.9/0.1 | 950 | 4,200 | 0.92 |

Brookfield Viscosity at 12 rpm
Viscoelasticity

Besides Lauryl Acrylate (LA), Lauryl Methacrylate (LMA) is also investigated as the hydrophobic comonomer for HAP brine dispersion polymerization. Polymer V is synthesized under the same conditions as polymer IV except that 0.26 gram of LMA is used instead of 0.7 gram of LA. Good dispersion along with high association property is obtained from this product. Furthermore, it appears that less amount of LMA (0.1 mol %) is required to achieve the similar association property as Polymer IV containing 0.25 mol % LA.

Example 5

15% Active Content

TABLE 5

HAP Brine dispersion polymerization samples

| Polymer | Monomers | Feed Ratio (Mol %) | Active Content (wt %) | Bulk Viscosity (cP)[1] | 0.5% solution Viscosity (cP)[1] |
|---|---|---|---|---|---|
| VI | AA/AM/LA | 50/49.75/0.25 | 15 | 580 | 5,500 |

In order to reduce manufacture cost of HAP dispersion process, higher active content in HAP brine dispersion polymerization is also investigated. 15% active content HAP dispersion product is obtained when 15% $(NH_4)_2SO_4$ salt is used. Again, good dispersion and high association are obtained for this dispersion product.

Example 6

Retention and Drainage Aid

The retention and drainage properties for print and writing paper are investigated by Britt jar retention tests and Canadian Standard Freeness (CSF) drainage tests to compare the performance of the HAPs of the invention, with those of the following: a non-hydrophobic modified polymer; a conventional anionic polyacrylamide flocculent; and inorganic and organic drainage aids commonly referred to within the industry as "microparticles" or "micropolymers".

The Britt jar (Paper Research Materials, Inc., Gig Harbor, Wash.) retention test is known in the art. In the Britt jar retention test a specific volume of furnish is mixed under dynamic conditions and an aliquot of the furnish is drained through the bottom screen of the jar, so that the level of fine materials which are retained can be quantified. The Britt jar utilized for the present tests is equipped with 3 vanes on the cylinder walls to induce turbulent mix, and a 76µ screen in the bottom plate is utilized.

The CSF device (Lorentzen & Wettre, Code 30, Stockholm, Sweden) utilized to determine relative drainage rate or dewatering rate also is known in the art (TAPPI Test Procedure T-227). The CSF device comprises a drainage chamber and a rate measuring funnel, both mounted on a suitable support. The drainage chamber is cylindrical, fitted with a perforated screen plate and a hinged plate on the bottom, and with a vacuum tight hinged lid on the top. The rate measuring funnel is equipped with a bottom orifice and a side, overflow orifice.

The CSF test is conducted by placing 1 liter of furnish, typically at 0.30% consistency, in the drainage chamber, closing the top lid, and then immediately opening the bottom plate. The water is allowed to drain freely into the rate measuring funnel; water flow which exceeds that determined by the bottom orifice will overflow through the side orifice and is collected in a graduated cylinder. The values generated are described in millimeters (mls) of filtrate; higher quantitative values represent higher levels of dewatering.

The furnish employed in this first series of tests is a synthetic alkaline furnish. This furnish is prepared from hardwood and softwood dried market lap pulps, and from water and further materials. First, the hardwood and softwood dried market lap pulp are separately refined in a laboratory Valley Beater (Voith, Appleton, Wis.) These pulps are then added to an aqueous medium.

The aqueous medium utilized in preparing the furnish comprises a mixture of local hard water and deionized water to a representative hardness. Inorganic salts are added in amounts so as to provide this medium with a representative alkalinity and total conductivity.

To prepare the furnish, the hardwood and softwood are dispersed into the aqueous medium at typical weight ratios of hardwood and softwood. Precipitated calcium carbonate (PCC) is introduced into the furnish at 25 weight percent, based on the combined dry weight of the pulps, so as to provide a final furnish comprising 80% fiber and 20% PCC filler.

The first series of tests is conducted with the following: Polymer II, a hydrophobically associative anionic polyacrylamide of the invention as discussed herein; Polymer I, an unmodified anionic polyacrylamide control polymer as discussed herein; Polymer E, a high MW commercial anionic flocculant; Polyflex CP.3, a commercial polyacrylamide drainage aid (Cytec Industries, Inc., West Patterson, N.J.); and bentonite clay, also commonly employed in the industry as a drainage and retention aid.

The Britt jar retention tests in this first series are conducted with 500 mls of the synthetic furnish, having a typical solids concentration of 0.5%. The test is conducted at a constant rpm speed according to the following parameters, consistent with the sequence set forth in Table 2: add starch, mix; add alum, mix; add polymer flocculent, mix; add drainage aid, mix; obtain filtrate.

The cationic potato starch utilized is Stalok 600 (A.E. Staley, Decatur, Ill.), and the alum is aluminum sulfate-octadecahydrate available as a 50% solution (Delta Chemical Corporation, Baltimore, Md.). The cationic flocculant utilized, referred to as CPAM-P, is a 90/10 mole % acrylamide/N,N-dimethylaminoethylacrylate methyl chloride quaternized; this material is commercially available as a self-inverting water-in-oil emulsion.

The retention values reported in Table 6 are fines retention where the total fines in the furnish is first determined by "washing" 500 mls of furnish with 10 liters of water under mixing conditions to remove all the fine particles, defined as particles smaller than the Britt jar 76µ screen. The fines retention for each treatment is then determined by draining 100 mls of filtrate after the described addition sequence, then filtering the filtrate through a pre-weighed 1.5µ filter paper. The fines retention are calculated according to the following equation:

% Fines retention=(filtrate wt−fines wt)/filtrate wt where the filtrate and fines weight are both normalized to 100 mls. Retention values represent the average of 2 replicate runs.

The CSF drainage tests are conducted with 1 liter of the furnish at a solids concentration of 0.30%. The furnish is prepared for the described treatment externally from the CSF device, utilizing equivalent speeds and mixing times as described for the Britt jar tests, in a square beaker to provide turbulent mixing. Upon completion of the addition of the additives and the mixing sequence, the treated furnish is poured into the top of the CSF device and the test is conducted.

In both Britt jar retention and CSF drainage tests, higher quantitative values indicate higher activity and a more desired response.

The data set forth in Table 6 illustrates the superior activity provided by HAP Polymer IV, as compared to the results obtained with unmodified control Polymer III and the conventional anionic flocculent Polymer X. Further, the polymer of the invention provides activity equivalent to that of bentonite clay and approaching that of Polyflex CP.3. The described material dosages are all based upon product actives, unless noted otherwise.

TABLE 6

| ADD # 1 | lbs/ton (active) | ADD # 2 | lbs/ton (active) | Polymer | lbs/ton (active) | Drainage Aid | Lbs/ton (active) | Avg. % Ret | CSF, mls |
|---|---|---|---|---|---|---|---|---|---|
| Cationic Potato Starch | 10 | Alum | 5 | None | | | | 27.29 | 395 |
| Cationic Potato Starch | 10 | alum | 5 | CPAM-P Flocculant | 0.5 | none | 0 | 48.43 | 380 |
| Cationic Potato Starch | 10 | alum | 5 | CPAM-P Flocculant | 0.5 | Polymer IV | 0.75 | 69.54 | 620 |
| Cationic Potato Starch | 10 | alum | 5 | CPAM-P Flocculant | 0.5 | Polymer X | 0.75 | 53.16 | 540 |
| Cationic Potato Starch | 10 | alum | 5 | CPAM-P Flocculant | 0.5 | Polyflex CP.3 | 0.75 | 77.85 | 650 |
| Cationic Potato Starch | 10 | alum | 5 | CPAM-P Flocculant | 0.5 | Bentolite HS | 4 | 64.72 | 600 |

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for producing a hydrophobically associative polymer which comprises:

forming a monomer solution comprising surfactant, at least one hydrophobic ethylenically unsaturated monomer, at least one hydrophilic monomer selected from nonionic ethylenically monomers, cationic ethylenically unsaturated monomers, anionic ethylenically unsaturated monomers or mixtures thereof, and water;

forming a salt solution comprising multivalent salt, stabilizer and water;

mixing the monomer solution and the salt solution to form a mixed solution; and charging the mixed solution with an initiator, thereby causing polymerization of the monomers to form the hydrophobically associative polymer.

2. The method of claim 1 wherein the monomer solution is formed by:

mixing the at least one hydrophilic monomer and water to form a monomer solution;

adding at least one hydrophobic ethylenically unsaturated monomer and surfactant to the monomer solution; and mixing until homogeneous.

3. The method of claim 1, wherein the stabilizer is present in an amount of up to 10% by weight of the salt solution.

4. The method of claim 3, wherein the stabilizer is chemically modified guar gum.

5. The method of claim 3, wherein the stabilizer is present in an amount from about 0.05% to about 2% by weight of the salt solution.

6. The method of claim 3, wherein the stabilizer is present in an amount from about 0.1% to about 0.5% by weight of the salt solution.

7. The method of claim 1, wherein the surfactant is present in an amount up to about 10% by weight of the monomer solution.

8. The method of claim 7, wherein the surfactant is sodium dodecyl sulfate.

9. The method of claim 1, wherein the monomers in the monomer solution are acrylic acid, acrylamide, and lauryl acrylate.

10. The method of claim 1, wherein the salt is present in an amount up to about 50% by weight of the salt solution.

11. The method of claim 1 wherein the salt in the salt solution is present in an amount from about 10 to about 30 weight percent, and the free radical initiator is present in an amount of about 0.01 to about 0.5 grams per 100 grams of the total monomer.

12. An aqueous dispersion comprising the water soluble hydrophobically associative polymer made by the method of claim 1.

13. The method of claim 1 wherein the monomer solution is formed by mixing at least one hydrophilic monomer selected from nonionic ethylenically monomers, cationic ethylenically unsaturated monomers, anionic ethylenically unsaturated monomers or mixtures thereof and water and adding at least one hydrophobic ethylenically unsaturated monomer and surfactant and mixing until homogeneous.

14. The method of claim 1 where in the monomer solution comprises acrylic acid, acrylamide, lauryl acrylate, an anionic surfactant, and water.

* * * * *